UNITED STATES PATENT OFFICE.

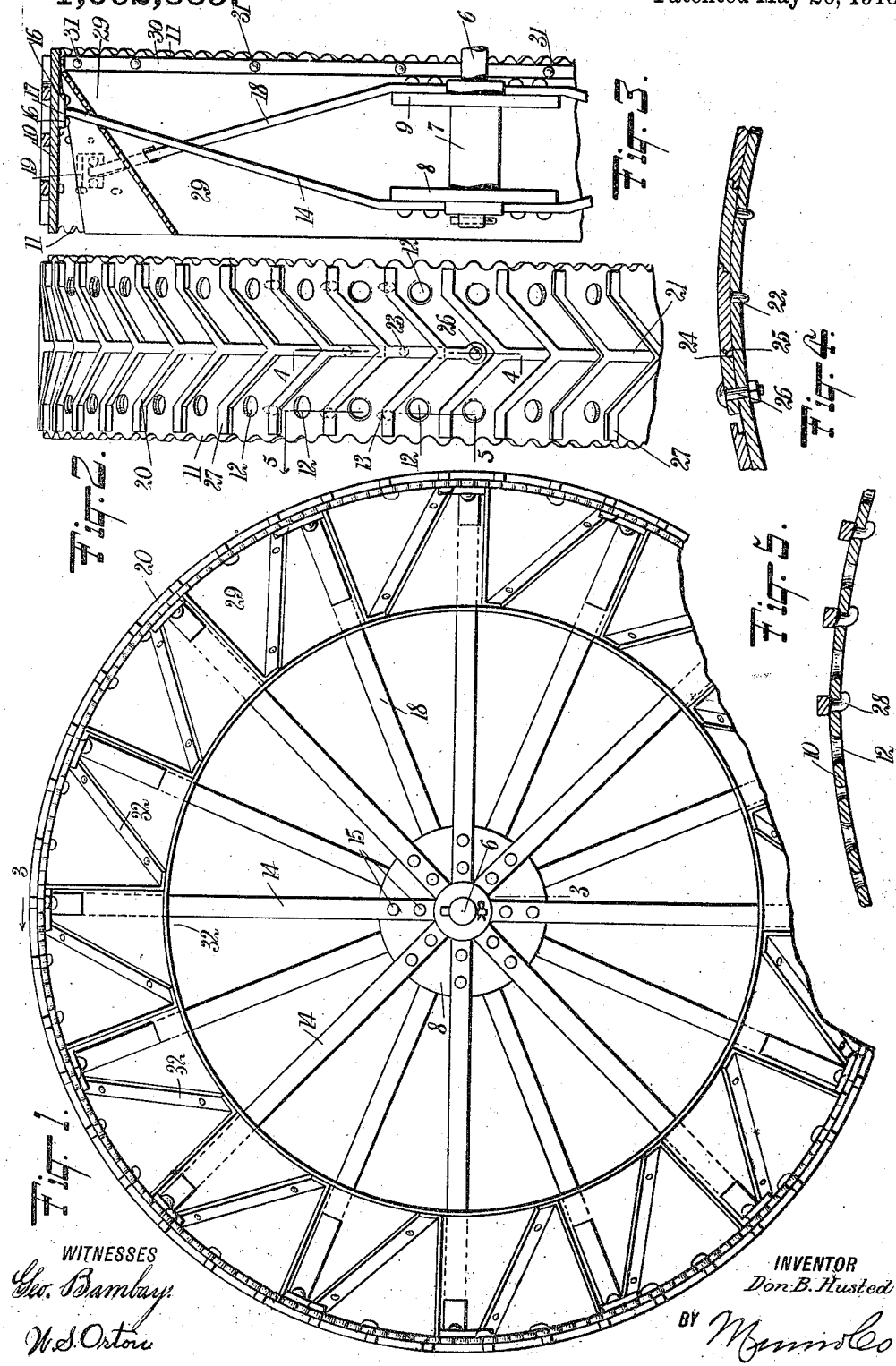

DON B. HUSTED, OF AUBURN, OHIO.

TRACTION-WHEEL.

1,062,335.  Specification of Letters Patent. Patented May 20, 1913.

Application filed January 29, 1912. Serial No. 673,978.

*To all whom it may concern:*

Be it known that I, DON B. HUSTED, a citizen of the United States, and a resident of Auburn, in the county of Geauga and State of Ohio, have invented a new and useful Traction-Wheel, of which the following is a full, clear, and exact description.

My invention relates to a traction wheel particularly adapted for use on agricultural vehicles, and an object of my invention is to provide a plane band traction wheel having a high degree of traction, which wheel may be readily converted into a rough shod traction wheel.

A further object of my invention is to provide a traction wheel which will positively grip the solid earth beneath the mud or slush when in the form of either a rough shod or a plane band wheel.

A further object of my invention is to provide a traction wheel of the above-indicated character in which the mud or slush is permitted to pass through the wheel and be ejected from one side thereof during the rotation of the same, protecting the journal and gearing on the inner side of the wheel.

A further object of my invention is to provide a wheel of the above-indicated character in which the ground gripping lugs may be removably affixed to the outer circumference of the wheel.

I obtain the above-outlined objects, by mounting upon the outer circumference of a broad banded, perforated and scalloped edge rim, a series of removable lugs, and positioning within the circumference of the wheel a conical shaped drum with transversely disposed partitions forming pockets opening outwardly, by means of which the mud or slush passing through the apertures falls into the inclined pockets and is ejected away from the interior of the wheel and away from the wheel itself.

Reference is to be had to the accompanying drawings, forming a part of this specification, in which similar characters of reference indicate corresponding parts in all the figures, and in which—

Figure 1 is a side elevation of the outside of a wheel, showing a physical embodiment of my invention; Fig. 2 is an edge view of a part of the wheel shown in Fig. 1; Fig. 3 is a transverse sectional view taken on the line 3—3 of Fig. 1, and looking in the direction of the arrow; Fig. 4 is a transverse sectional view taken on the line 4—4 of Fig. 2; and Fig. 5 is a similar view taken on the line 5—5 of Fig. 2.

Described more in detail, I have shown an axle 6, upon which is mounted a hub 7, adjacent the opposite ends of which are mounted an outer face plate 8 and an inner face plate 9. Concentrically mounted relatively to the hub 7, is a broad flat rim 10, the opposite edges of which are serrated, as shown at 11. The rim 10 has a series of rounded apertures 12 extending therethrough, and, as shown in Fig. 2, said apertures are arranged in pairs of lines adjacent opposite edges, or, if desired, may be disposed nearer the center of the rim. Disposed between each pair of adjacent apertures 12, is a relatively short elongated opening 13 for a purpose hereinafter described.

The rim 10 is maintained in its spaced relation relative to the hub 7 by means of two sets of spokes, the members 14 of one set being securely fastened by means of rivets 15 to the outer face of the plate 8 and extending diametrically and transversely of the plane of the wheel, and rigidly fastened by means of bolts 16 passing through the end face plate 17 to the inside of the rim 10 on the side opposite to the side adjacent to the face plate 8. The members 18 of the other set are similarly fastened to the inside of the face plate 9 and extend transversely to the opposite edge of the rim 10 and fastened to said rim by suitable bolts 19.

Disposed about the outside of the rim 10 is a series of Y-shaped lugs 20, the stems 21 of which are arranged in alinement, which stems have projecting from the under side thereof, a stud 22 passing through one of the apertures 23. These apertures extend through the rim centrally about the same. The crotch of each of these lugs 20 has an under-cut pocket 24 adapted to overlap a mitered end 25 of the stem of the next adjacent lug. In this way it will be seen that all of the lugs are held in position on the wheel. As the last lug cannot be inserted under the first lug, this last lug is held by a bolt 26 passing through its shank and through the rim of the wheel. The arms of each of the Y-shaped lugs are turned outwardly so as to form a portion 27 transversely of the wheel, and these out-turned portions are held in position by means of hooks 28 which extend through the openings 13 and are offset, as shown in Fig. 5, to more securely hold these lugs in position. It will be noted from Fig. 5, and particularly the left-hand side thereof, that the rim openings 13 which receive the hooks 28 are provided with rounded edges in order that said edges will not become battered or inturned during the use of the wheel without the lugs.

In order to eject the mud passing through the apertures 12, there is positioned within the wheel, a mud ejector 29 in the form of the frustum of a cone, the small end of which faces outwardly. The large end of this ejector has a peripheral flange 30 fastened to the inside of an adjacent inner edge of the rim 10 by means of rivets 31. Disposed between the conical ejector 29 and the inner surface of the rim 10, is a series of partitions 32, preferably extending from one spoke to the next adjacent spoke inclined both to the axis and to the plane of the wheel, and facing in the direction of rotation of the wheel, to eject the mud falling into the outwardly open pockets formed by the ejector, rim and adjacent partitions.

Having thus described my invention, what I claim as new and desire to secure by Letters Patent is:

1. A traction wheel comprising a relatively broad flat rim, and a plurality of Y-shaped lugs mounted flatwise and snugly on the outside of said rim, the stems of said lugs adjoining one another in a continuous line and in end to end relation.

2. A traction wheel comprising a relatively broad flat rim, a plurality of Y-shaped lugs mounted on the outside of said rim, the stems of said lugs being in a continuous line and adjoining one another, coincident with the median line of the rim, and means having connection with the arms of each of said Y-shaped lugs and removably fastening said lugs to said rim.

3. A traction wheel comprising a relatively broad flat rim, and a plurality of Y-shaped lugs mounted on the outside of said rim, the stems of said lugs being in a continuous line, the crotch of each of said Y-shaped lugs having an undercut pocket adapted to receive the mitered end of the stem of the next adjacent lug.

4. A traction wheel comprising a relatively broad flat rim, a plurality of Y-shaped lugs mounted snugly on the outside of the rim, the stems of the lugs being in a continuous line and adjoining one another around the rim, and the branches of said lugs having sections adjacent their extremities which extend substantially at right angles to the stems and each provided with a hooked projection extending rearwardly through a conformable opening in the rim and engaging the under surface of the latter.

In testimony whereof I have signed my name to this specification, in the presence of two subscribing witnesses.

DON B. HUSTED.

Witnesses:
W. B. ALGER,
W. H. WINCHELL.